106. COMPOSITIONS, COATING OR PLASTIC.
98

218,490

UNITED STATES PATENT OFFICE.

HAMILTON A. COMINS, OF OSWEGO, KANSAS.

IMPROVEMENT IN ARTIFICIAL STONE.

Specification forming part of Letters Patent No. 218,490, dated August 12, 1879; application filed June 14, 1879.

*To all whom it may concern:*

Be it known that I, HAMILTON A. COMINS, of Oswego, in the county of Labette and State of Kansas, have invented certain new and useful Improvements in Artificial Stone; and I do hereby declare that the following is a full, clear, and exact description of the construction and operation of the same.

My invention relates to the manufacture of artificial stone; and it consists in the combination of cement, plaster-paris, sand, wood-ashes, and salt, substantially in the manner and proportions hereinafter specified.

I take twenty-five parts of cement, twenty-five parts of plaster-paris, twenty-five parts of clean sand, twelve and a half parts of wood-ashes, and twelve and a half parts of common salt, and mix the whole together with such an amount of water as will reduce the mass to the consistency of thin mortar. In this condition I mold the compound in the shape required in suitable molds of wood or iron. After molding the drying process is performed without the application of artificial heat.

The artificial stone thus manufactured is found of great value, and is useful for drain, sewer, water, and other pipes, as well as for curb-stones, sidewalk flagstones, and other like uses.

I claim as my invention—

The combination of cement, plaster-paris, sand, wood-ashes, and salt, substantially in the manner and proportions specified, for the purpose set forth.

In testimony that I claim the above I have hereunto subscribed my name in the presence of two witnesses.

HAMILTON A. COMINS.

Witnesses:
P. A. REEL,
MARTIN D. MILLER.